United States Patent [19]
Matsushita

[11] Patent Number: 5,901,238
[45] Date of Patent: May 4, 1999

[54] IRIS IDENTIFICATION SYSTEM AND IRIS IDENTIFICATION METHOD

[75] Inventor: Mitsuji Matsushita, Tokyo, Japan

[73] Assignee: Oki Electric Industry Co., Ltd., Tokyo, Japan

[21] Appl. No.: 08/797,311

[22] Filed: Feb. 7, 1997

[30] Foreign Application Priority Data

Feb. 7, 1996 [JP] Japan .................................... 8-020849

[51] Int. Cl.⁶ ........................................................ G06K 9/00
[52] U.S. Cl. ............................................ 382/117; 382/218
[58] Field of Search .................................... 382/117, 115, 382/118, 119, 124–127, 217, 218, 222, 278; 348/78

[56] References Cited

U.S. PATENT DOCUMENTS

| | | | |
|---|---|---|---|
| 4,641,349 | 2/1987 | Flom et al. ............................. | 382/117 |
| 4,975,969 | 12/1990 | Tal ............................................ | 382/118 |
| 5,067,162 | 11/1991 | Driscoll, Jr. et al. .................... | 382/126 |
| 5,291,560 | 3/1994 | Daugman ................................. | 382/117 |
| 5,561,718 | 10/1996 | Trew et al. ............................... | 382/118 |

FOREIGN PATENT DOCUMENTS 5-084166   12/1993   Japan .

OTHER PUBLICATIONS

R. P. Wildes et al., A System for Automated Iris Recognition, IEEE Publication, Applications of Computer Vision, 1994 Workshop, pp. 121–128.

*Primary Examiner*—Leo H. Boudreau
*Assistant Examiner*—Brian P. Werner
*Attorney, Agent, or Firm*—Rabin & Champagne,P.C.

[57] ABSTRACT

The iris identification system, which uses an iris pattern to identify a customer, extracts the matching bits between previously-registered iris data and obtained iris data and, compares the extracted bits with the registered iris data to increase the accuracy of customer identification.

20 Claims, 7 Drawing Sheets

IRIS IDENTIFICATION SYSTEM AND IRIS IDENTIFICATION METHOD

BACKGROUND OF THE INVENTION

1. Field of the Invention

The present invention relates to an iris identification system and an iris identification method for identifying a person with the use of his or her irises.

2. Prior Art

Various iris identification systems and identification methods for use on devices, such as automatic teller machine, have been devised heretofore to identify a person. Some of them are found, for example, in Japanese Examined Patent Publication 5-084166 and U.S. Pat. No. 5,291,560. A system according to those inventions photographs the irises of a customer to get the image data, and compares it with the previously-registered data. In general, this type of iris identification system uses a high sensitivity camera for high-precision identification. The iris identification system first identifies the head of a customer, finds the position of the eyes, zooms up and photographs the irises, and then obtains the iris data. The system compares the data with the previously-registered iris data to identify the customer.

One problem with a conventional iris identification system is that, when the illumination of a room where an automatic teller machine is installed is reflected in the customer's irises and pupils, the system photographs the irises as well as the reflection and, therefore, cannot obtain the correct iris data. In this case, because the obtained customer's iris data differs from the previously-registered customer's iris data remarkably, the system does not identify the customer correctly.

SUMMARY OF THE INVENTION

The iris identification system according to the present invention comprises storage means for storing a plurality of iris data pieces, photograph means for photographing an iris pattern, generation means for generating iris data representing the iris pattern from the iris pattern, extraction means for extracting a matching portion between the generated iris data and one of the plurality of iris data pieces, and identification means for checking whether or not the iris pattern matches one of the plurality of iris data pieces based on the extracted portion and one of the plurality of iris data pieces.

The iris identification method according to the present invention comprises the steps of photographing an iris pattern, generating iris data representing the iris pattern from the iris pattern, extracting a matching portion between the generated iris data and one of the plurality of iris data pieces stored in advance, checking whether or not the iris pattern matches one of the plurality of iris data pieces based on the extracted portion and one of the plurality of iris data pieces.

The present invention extracts only a portion of iris data that is significant to identify a person, and identifies the person based on the extracted portion, giving accurate identification results.

The present invention also accumulates extracted portions, and identifies the person based on those portions, giving still more accurate identification results.

BRIEF DESCRIPTION OF THE DRAWINGS

The present invention will be understood more fully from the detailed description and the accompanying drawings below of the preferred embodiments of the invention.

In the drawings.

DESCRIPTION OF THE PREFERRED EMBODIMENTS

Figure 1:
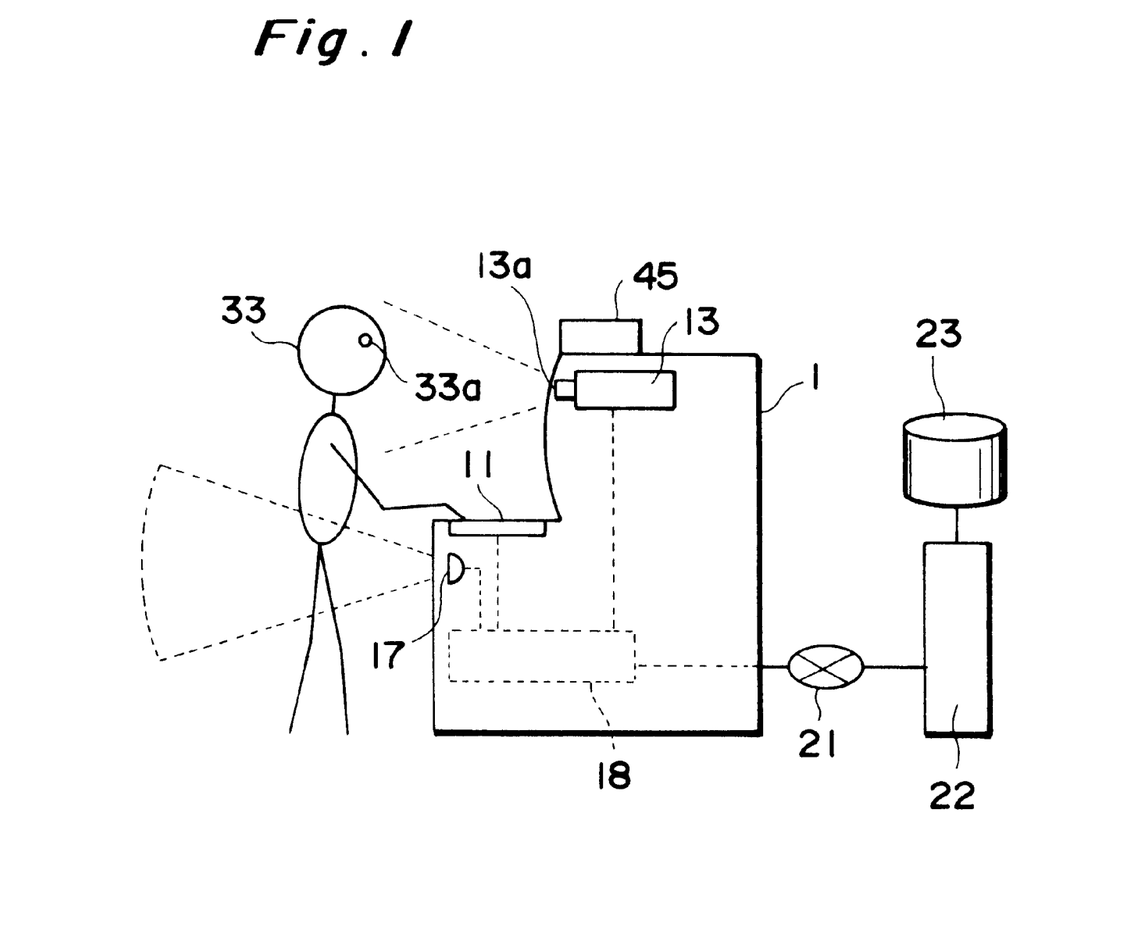
FIG. 1 is an illustration of the iris identification system according to the present invention.
Figure 2:
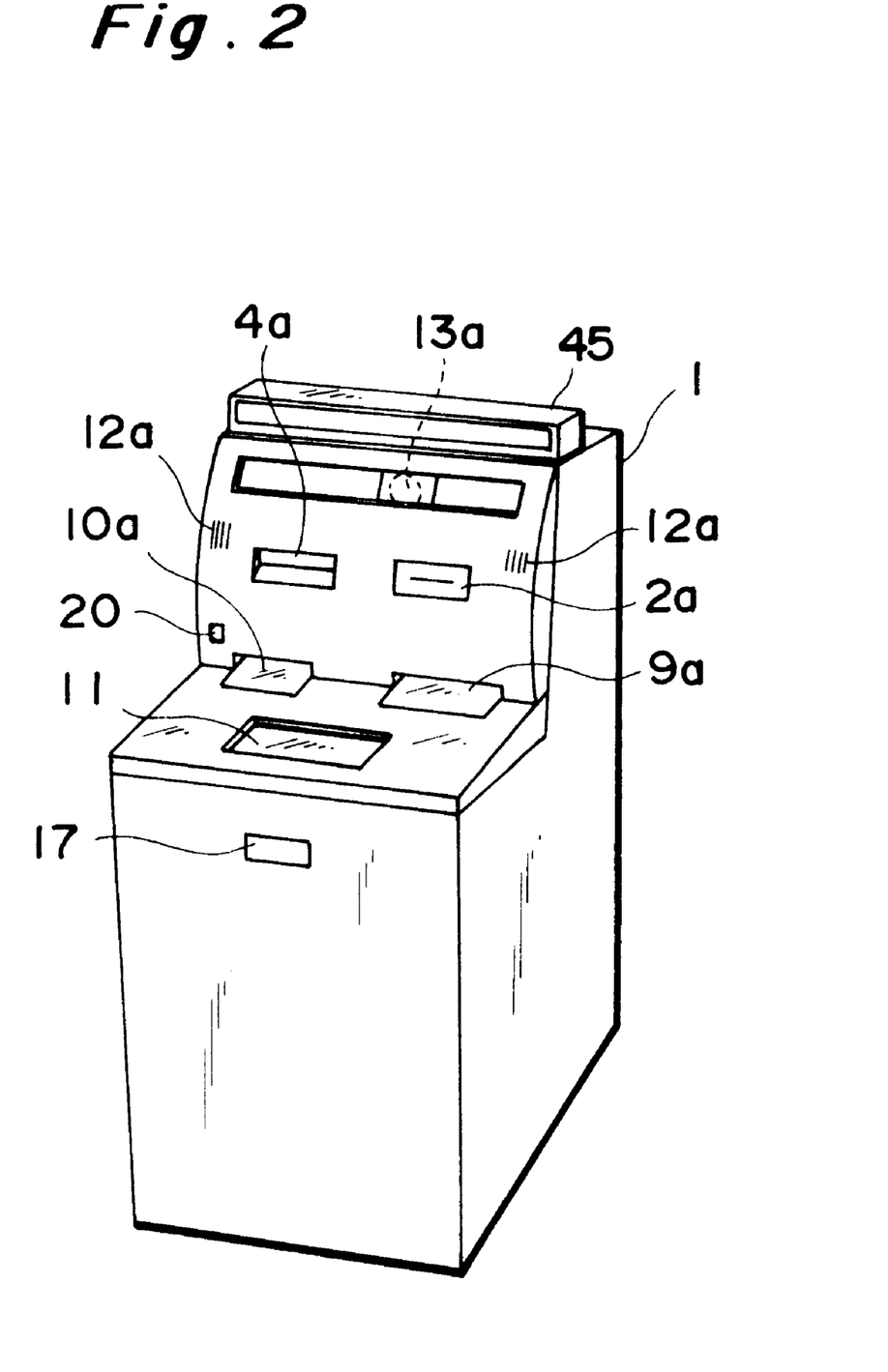
FIG. 2 is a perspective view of the automatic teller machine according to the present invention.
Figure 3:
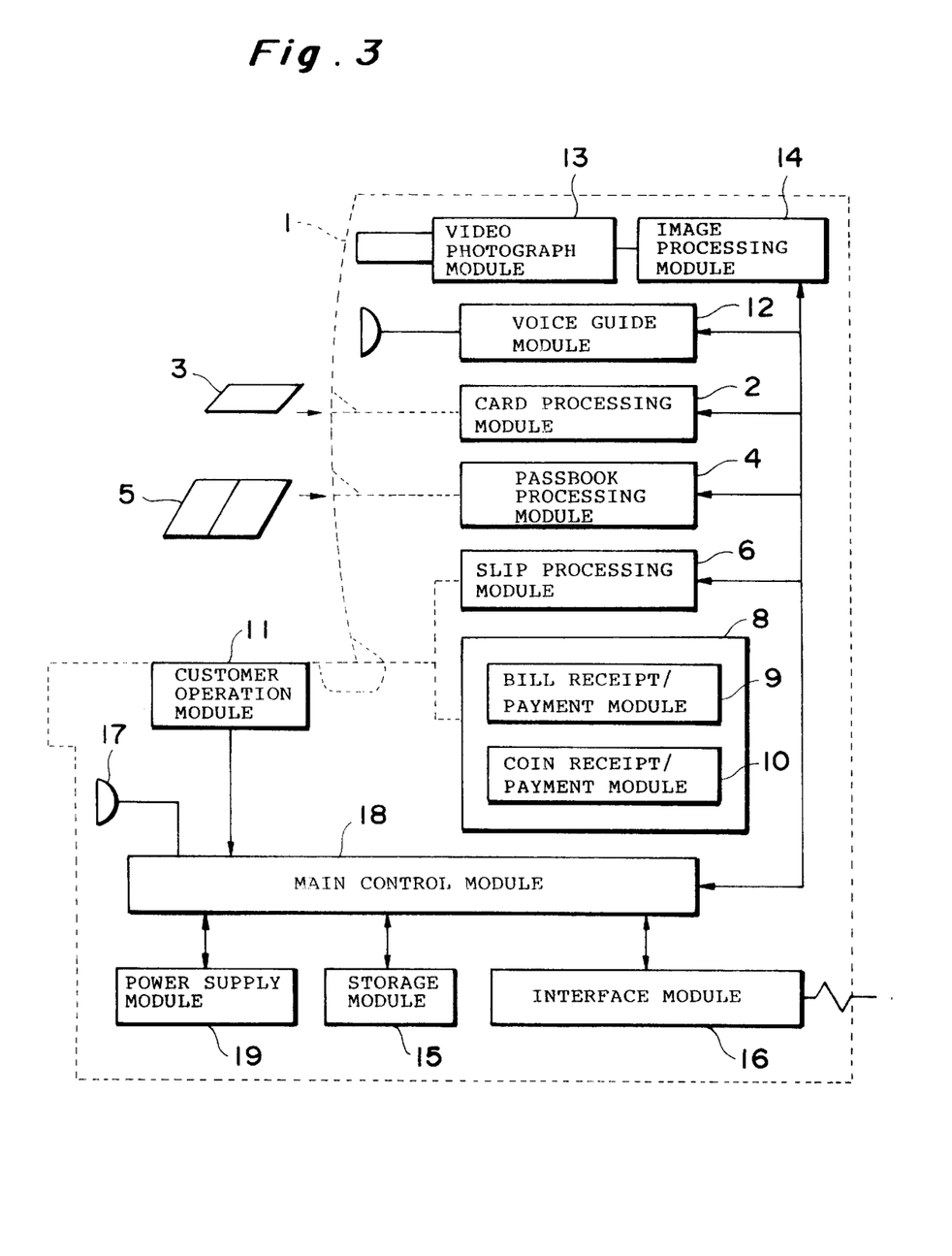
FIG. 3 is a control block diagram of the automatic teller machine according to the present invention.
Figure 4:
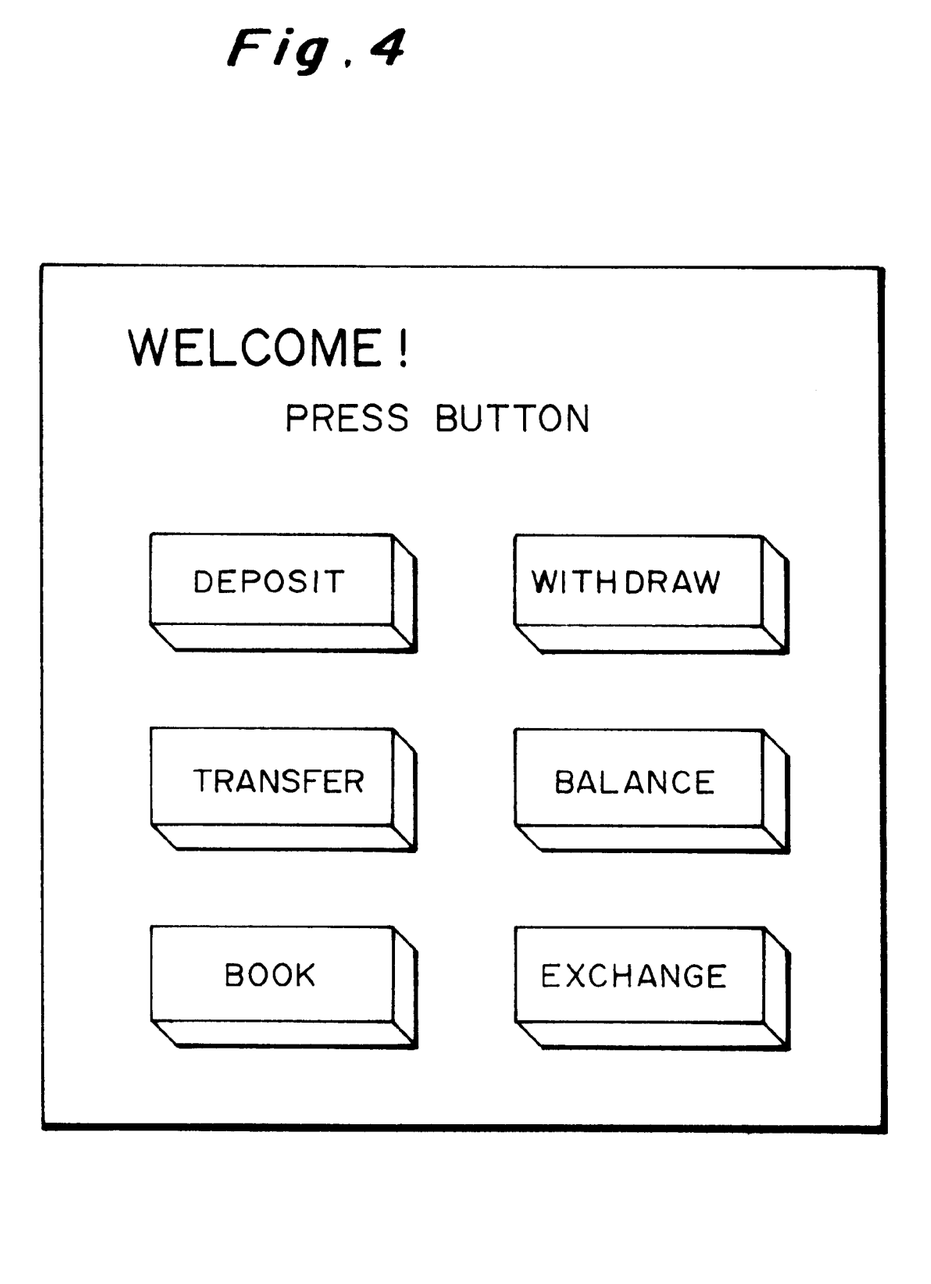
FIG. 4 is an example of the customer guide screen on an ATM.

Referring to the attached drawings, there is shown an embodiment of the present invention. FIG. 1 is an illustration of the iris identification system according to the present invention, FIG. 2 is a perspective view of the automatic teller machine according to the present invention, FIG. 3 is a control block diagram of the automatic teller machine according to the present invention, and FIG. 4 is an example of the customer guide screen on an ATM. In this embodiment, an automatic teller machine using the iris identification system is explained. As shown in the figure, the ATM (automatic teller machine) 1 has the card processing module 2. The card processing module 2 reads customer information, such as a bank code and a customer account number, recorded on an ID (customer identification) card 3 issued by the bank.

The ID card 3 is inserted into, or returned from, the card slot 2a in front of the card processing module 2. The passbook processing module 4 prints on the passbook 5 inserted from the passbook slot 4a and performs other processing. The passbook processing module 4 also reads or updates data recorded on the magnetic stripe on the cover of the passbook 5, detects a page on which data is to be printed, and changes pages as necessary. The money processing module 8 includes the bill receipt/payment module 9 and the coin receipt/payment module 10. The bill receipt/payment module 9 checks the bills put by a customer, counts the bills, sends them to the bill storage boxes(not shown), or obtains the bills to be paid to the customer from the bill storage boxes.

The coin receipt/payment module 10 checks the coins put by a customer, counts them, sends them to the bill storage boxes (not shown), or obtains the coins to be paid to the customer. To the money processing module 8, the bill receipt/payment box 9a is connected through which a customer receives or puts bills. Also connected to the money processing module 8 is the coin receipt/payment box 10a though which a customer receives or puts coins. The bill receipt/payment box 9a and the coin receipt/payment box 10a have respective shutters, to control bill and coin entry and payment.

The customer operation module 11 is a touch panel through which a customer accesses the automatic teller machine or on which user guidance messages are displayed. As shown in FIG. 4, it displays transaction items, such as "Deposit", "Withdraw", or "Transfer". Touching one of them allows a customer to select a transaction. The voice guide module 12 having the speaker/microphone 12a on the front of the machine, guides a customer through the operation steps by voice. The video photograph module 13 having the camera 13*a* which photographs the irises of the eyes 33*a* of the customer 33 and the view-moving mechanism of the camera 13*a*. The view-moving mechanism (not shown) moves the view of the camera within a specified range. The image processing module 14 processes image data obtained by the video photograph module 13.

The storage module 15 includes RAM (random access memory) containing the program for controlling the operations, ROM (read-only memory), and a floppy disk drive. The I/F (interface) module 16 is an interface between the ATM 1 and the host computer 22 to which the ATM is connected. The access detector 17 detects that a customer is approaching the ATM 1, and calculates the distance to, and the position of, the customer.

The main control module 18 controls the components which are described above. The power supply module 19 supplies power to the components. The call button 20 allows a customer to call the person in charge and to talk to him. The I/F module 16 is connected to the host computer 22 over the communication line 21. The host computer 22 has the storage device 23 which contains the customer information file. This file, in turn, contains customer information such as customer account numbers, balances, and iris image data. At the top of the ATM 1 is the scattered light source 45 which adjusts the size of the pupils of the customer 33.

The following explains iris data briefly. The surface layer of the eyes of a person, especially that of the irises, is composed of a pattern such as radiated black lines with the lens at the center. This pattern, which is formed in his or her childhood, varies every person and, for the same person, differs between the right eye and the left eye. So, this iris pattern is useful for identifying individuals. This iris pattern is optically scanned along a specified line, and its light portions and dark portions are digitized for use as iris data.

The following explains how the iris identification system described above obtains iris data. As shown in FIG. 1, when the customer 33 approaches the ATM 1 to execute a transaction, the access detector 17 detects that the customer 33 is in the specified vicinity of the ATM 1. Upon receiving this information, the main control module 18 displays the customer guide screen shown in FIG. 4, and prompts the customer to select a transaction item. At the same time, the main control module 18 issues a photograph instruction to the video photograph module 13 via the image processing module 14. The video photograph module 13 obtains video data on the surrounding, compares it with the video data which was obtained several frames before, and detects the changes in the video data. Then, it compares the shape of the changed video data with the shape of a human being previously stored in the machine to check if the shape is that of a person. When the shape is similar to that of a person, the main control module determines that the object is a person and that the customer 33 is going to do a transaction.

Then, the video photograph module 13 finds the "face" of the customer 33, identifies the position of the "eyes", and informs the main control module 18 that iris data may be obtained. Upon receiving this information, the main control module 18 zooms up the camera 13*a* and photographs the irises. At this time, the scattered light source 45 emits scattered lights to adjust the size of the pupils, because the iris varies in size according to the size of the pupil. More specifically, the main control module 18 decreases the intensity of the scattered light source 45 when the pupil is small, or increases the intensity when the pupil is large. Iris data, generated from the data gathered in this manner, is sent to the host computer 22 and, at the same time, stored temporarily in the storage module 15 in the ATM 1.

When a customer inserts the ID card 3 into the slot, the machine sends the ID number of the ID card 3 to the host computer 22 to get the corresponding data from the customer information file in the storage device 23. Next, the iris data sent from the ATM 1 to the host computer 22 is compared with the registered data. When they match, the customer is identified. Then, information such as the name and account number of the customer 33 is displayed on the customer operation module 11 to prompt him or her to select a transaction and to confirm what is selected. The customer executes the transaction sequentially by following the instructions on the touch panel, or from the speaker/microphone, of the customer operation module 11.

Figure 5:
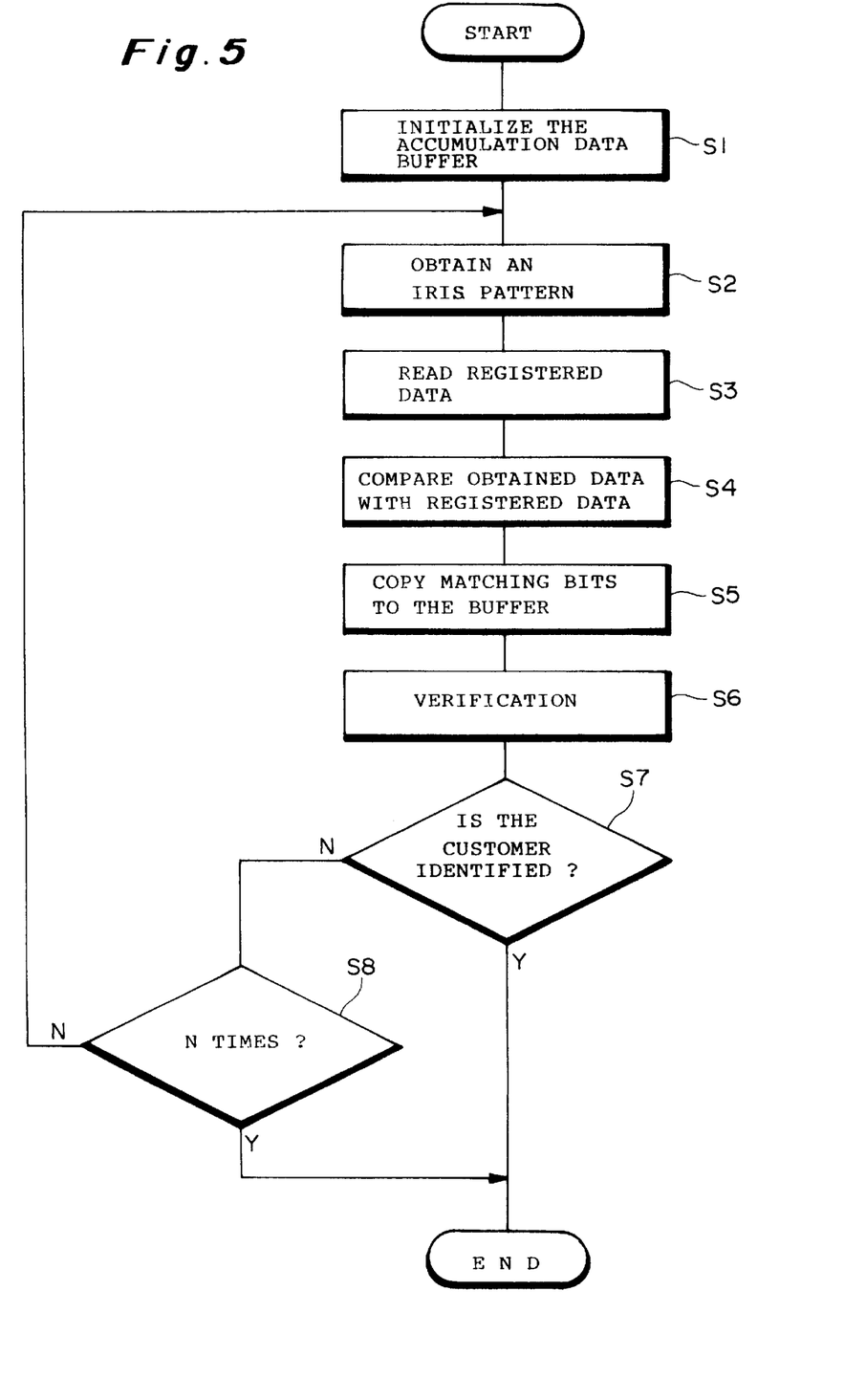
FIG. 5 is a flowchart showing the first processing procedure for iris data.
Figure 6:
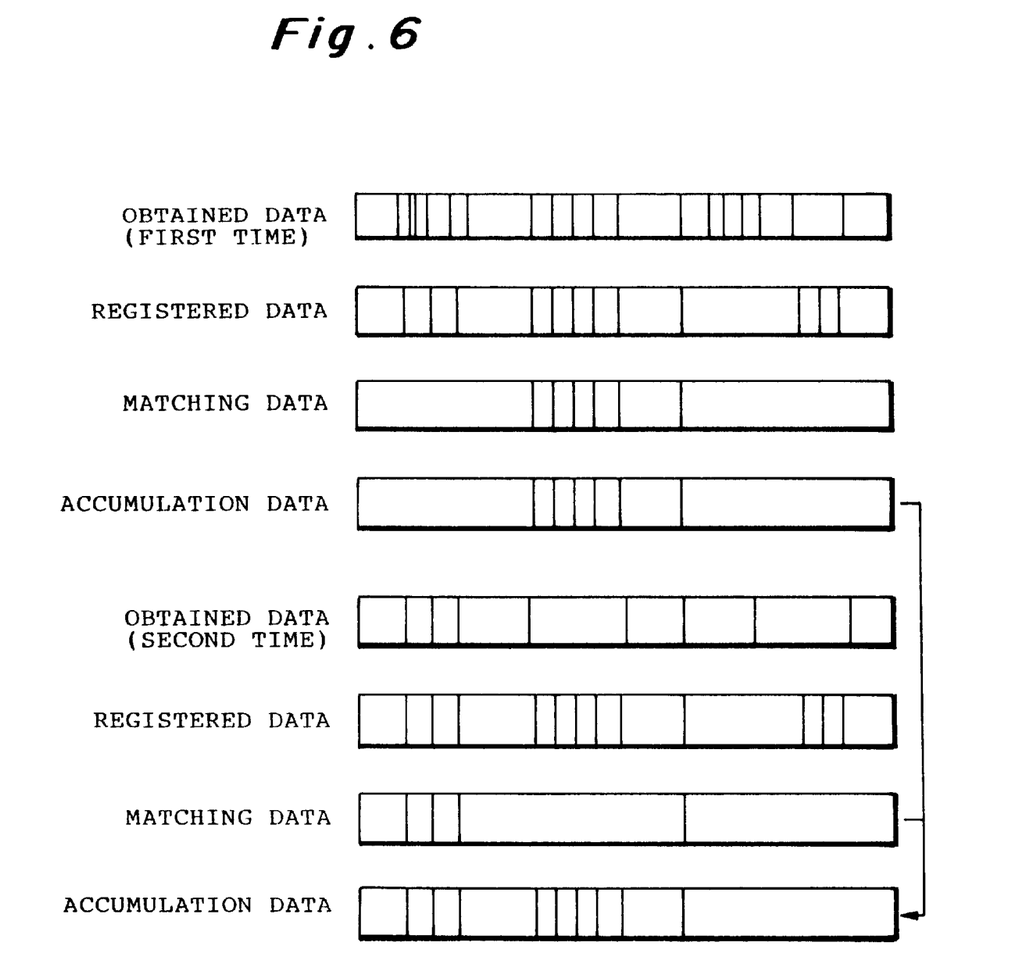
FIG. 6 is an illustration showing iris data.

Referring now to the drawings, there is shown the first processing procedure. FIG. 5 is a flowchart showing the first processing procedure, and FIG. 6 is a diagram showing data about irises. As shown in FIG. 5, the main control module 18 initializes the accumulation data buffer. Immediately after initialization, the buffer contains nulls. (step 1). Then, the main control module 18 obtains the iris patterns as described above (step 2).

As shown in FIG. 6, iris data is represented as a bit string in the linear format. This data varies according to the conditions, such as the illumination angle, iris status, or extraneous matters, under which the irises were photographed. This means that, in most cases, the obtained data does not match the registered data.

To solve this problem, the system execute the following steps. First, the main control module 18 reads registered data (step 3) and, by adjusting the bit positions of the obtained data to the bit positions of the registered data, makes the bit positions synchronized (step 4). More specifically, the module shifts the whole obtained data to the right or left, one bit at a time, to check if the bits are synchronized. The module repeats this process until the bits of the obtained data and the bits of the registered data are correctly synchronized. Furthermore, after they are synchronized, the module compares the obtained data with the registered data to extract the matching bits. The main control module 18 then copies the matching bits to the accumulation data buffer (step 5).

The main control module 18 performs verification using the registered data and the accumulated data (steps 6–7). If the verification does not identify the customer 33, the module checks if it has obtained the iris pattern the specified number of times (for example, n times) (step 8).

In this example, assume that n=3. If the module does not identify the customer as a result of verification after it obtained the iris pattern for the first time, it obtains the iris pattern again (step 2). In general, the data obtained in the second trial differs from that obtained in the first trial because the data depends on the conditions under which the iris pattern is obtained. Therefore, it is likely that the matching bits extracted in tie second trial differs from those extracted in the first trial. The module accumulates the bits extracted from the second iris data into the accumulation buffer in which the bits extracted in the first trial are stored (steps 4–5).

As in the first trial, the main control module 18 compares the accumulated data with the registered data to perform verification (step 6). If the module does not identify the customer as a result of the verification (step 7) it obtains the iris pattern again (step 2). As in the first and second trials, the module performs verification using the accumulated data, which includes the data obtained in the third trial (steps 4–6). If the main control module 18 does not identify the customer as a result of the verification, it returns the ID card 3 to the customer 33.

As explained above, the system obtains the iris pattern up to the specified number of times, extracts the matching bits from the obtained data and the accumulated data, and adds the extracted matching bits to the accumulation data buffer for use in the verification. This increases the accuracy of iris data used in the verification.

Figure 7:
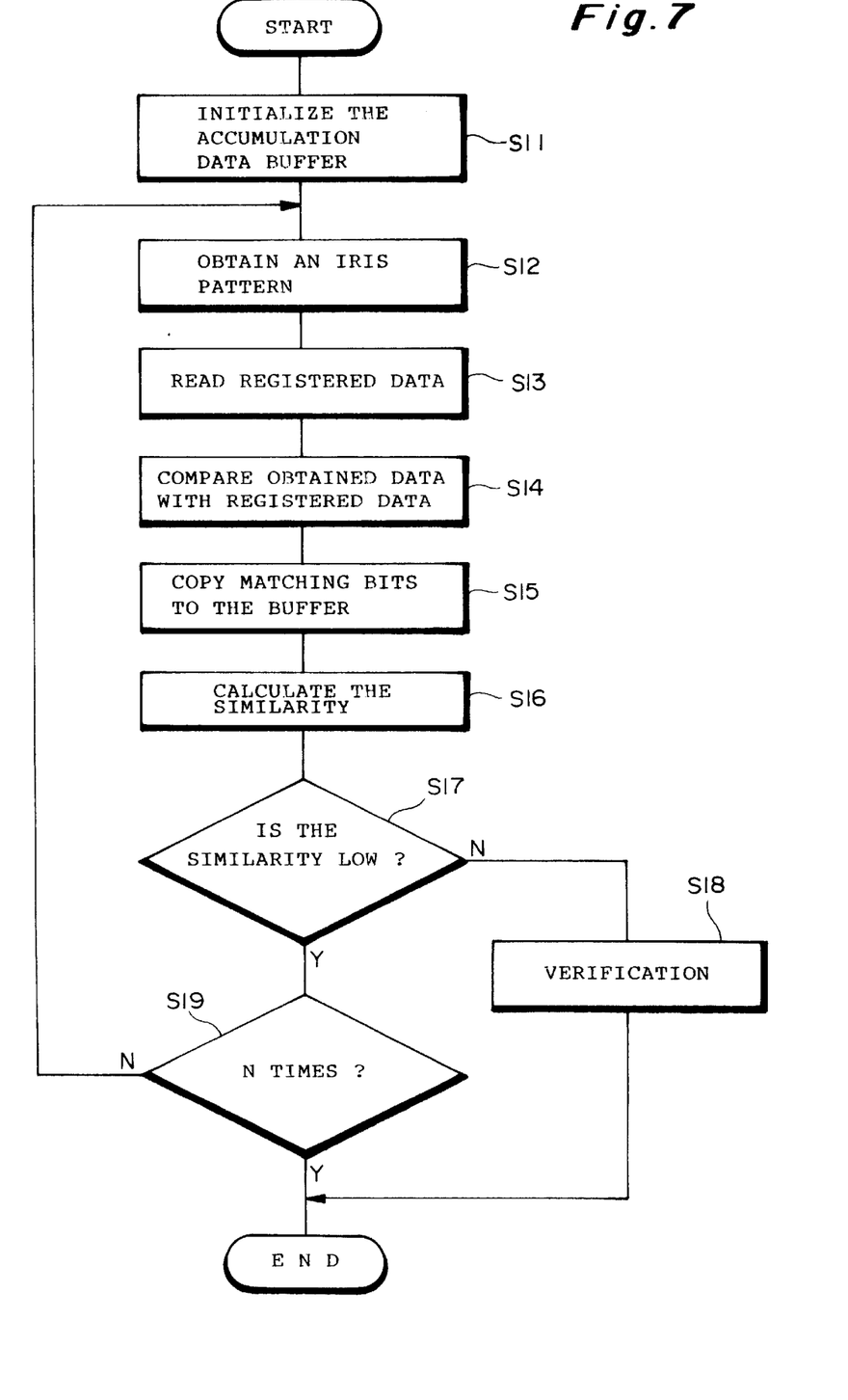
FIG. 7 is a flowchart showing the second processing procedure for iris data.

Referring now to the drawings, there is shown the second processing procedure for iris data. FIG. 7 is a flowchart showing the second processing procedure for iris data. As shown in FIG. 7, the main control module 18 initializes the accumulation data buffer (step 11). Then, the main control module 18 obtains the iris patterns according to the procedure described above (step 12).

Next, the main control module 18 reads registered data (step 13). The main control module 18 adjusts the bit positions of the obtained data to the bit positions of the registered data to make them synchronized, compares them, and extracts the matching bits (step 14). The main control module 18 then copies the matching bits to the accumulation data buffer (step 15).

The main control module 18 calculates the similarity between the registered data and the accumulated data using such a method as the Euclid's distance method (step 16). The similarity is defined, for example, as the ratio of the number of matching bits to the total number of bits. To increase the accuracy of calculation, it is desirable that the similarity be calculated using all the necessary bits. To further increase the accuracy of calculation, significant bits may be weighed; to reduce the calculation time, fewer bits may be used.

The main control module 18 checks if the similarity satisfies the specified threshold (step 17). If the similarity satisfies the specified threshold, the main control module 18 compares the accumulated data with the registered data to perform verification (step 18). Since some bits are significant and some others are not, it is desirable that the verification be performed with significant bits weighed.

On the other hand, if the similarity does not satisfy the threshold, the module checks if the iris pattern has been read the specified number of times (for example, n times) (step 19).

Assume that n=3 in this example. The module first obtains the iris pattern and, based on the obtained data, extracts the matching bits to generate accumulation data. If the similarity between the accumulated data and the registered data does not satisfy the specified threshold, the module obtains the iris pattern again (step 12). And, the module adds the matching bits extracted from the iris data obtained in the second trial to the accumulation data buffer in which the bits extracted in the first trial are stored (steps 14–15). Then, as in the first trial, the module calculates the similarity between the new accumulated data and the registered data (step 16).

If the similarity does not satisfy the threshold (step 17), the module obtains the iris pattern again (step 12). As in the first and second trials, the module calculates the similarity based on the data obtained in the third trial, and checks if the similarity satisfies the threshold (steps 14–17). If the similarity does not satisfy the threshold even in the third trial, the module determines that it does not identify the customer 33. It then stops the transaction, and returns the ID card 3 to the customer 33 (step 19).

As described above, the module tries to obtain the iris pattern up to the specified number of times, extracts the matching bits from the obtained data and the registered data, and adds the extracted bits to the accumulation data buffer to update its contents. When the updated accumulation data satisfies the specified threshold, the module performs verification. Thus, this system increases the accuracy of iris data to be used in the verification.

What is claimed is:

1. A method of identifying a person based on an iris pattern of the person, the method comprising:

performing a comparison process, including
sensing the iris pattern of the person to be identified,
generating iris data corresponding to the sensed iris pattern,
comparing the generated iris data with selected registered iris data so as to identify portions of the generated iris data and the selected registered iris data which match each other,
accumulating the identified matching portions of iris data, and
comparing the accumulated matching portions of iris data with the selected registered iris data, and based upon the comparison, judging whether the person to be identified corresponds to the selected registered iris data; and repeating the comparison process until either the person to be identified is judged to correspond to the selected registered iris data or a determination is made to discontinue the process according to a defined criterion, wherein the accumulation of matching portions of iris data includes the accumulation of matching portions of iris data from the most recently performed comparison process as well as all previous performances of the comparison process.

2. The method of claim 1, further comprising retrieving from a plurality of registered iris data, registered iris data corresponding to particular personal identification indicia; wherein the selected registered iris data is the retrieved registered iris data.

3. The method of claim 1, further comprising:

receiving an identifying characteristic; and
selecting the registered iris data corresponding to the identifying characteristic from among a plurality of registered iris data each of which corresponds to a different identifying characteristic, to determine the selected registered iris data.

4. The method of claim 3, wherein the received identifying characteristic is an identification number.

5. The method of claim 1, wherein said sensing includes photographing the iris pattern of the person to be identified.

6. A method of identifying a person based on an iris pattern of the person, the method comprising:

performing a similarity test, including
sensing the iris pattern of the person to be identified,
generating iris data corresponding to the sensed iris pattern,
comparing the generated iris data with selected registered iris data so as to identify portions of the generated iris data and the selected registered iris data which match each other,
accumulating the identified matching portions of iris data, and
determining whether the accumulated matching portions of iris data satisfies the test, satisfaction of the test being defined by the accumulated matching portions of iris data having at least a preset degree of similarity to the selected registered iris data, wherein the degree of similarity is based on a first criterion;

repeating the similarity test until either the similarity test is satisfied or a determination is made to discontinue the test according to a second defined criterion, wherein the accumulations of matching portions of iris data includes the accumulations of matching portions of iris data from the most recently performed similarity test as well as all previous performances of the similarity test; and when the similarity test is satisfied, comparing the accumulated matching portions of iris data with the selected registered iris data, and based upon the comparison, judging according to a third defined criterion different from the first defined criterion whether the person to be identified corresponds to the selected registered iris data.

7. The method of claim 6, further comprising retrieving from a plurality of registered iris data, registered iris data corresponding to particular personal identification indicia; wherein the selected registered iris data is the retrieved registered iris data.

8. The method of claim 6, further comprising:
receiving an identifying characteristic; and
selecting the registered iris data corresponding to the identifying characteristic from among a plurality of registered iris data each of which corresponds to a different identifying characteristic, to determine the selected registered iris data.

9. The method of claim 8, wherein the received identifying characteristic is an identification number.

10. The method of claim 6, wherein said sensing includes photographing the iris pattern of the person to be identified.

11. A device for identifying a person based on an iris pattern of the person, the device comprising
an accumulation buffer;
means for in succession obtaining images of the iris pattern of the person to be identified;
means for generating, from each of the successive images obtained by the image obtaining means, iris data corresponding to the iris pattern; and
means for
identifying in succession, from the successive images, portions of the iris data generated by said generating means which match selected registered iris data,
accumulating in succession, in the accumulation buffer, the successively identified matching portions of iris data from the successive images as well as all other images from which matching portions have been identified,
after each successive accumulation of matching portions of iris data in the accumulation buffer, comparing the accumulated matching portions of iris data with the selected registered iris data, and based upon the comparison judging whether the person to be identified corresponds to the selected registered iris data, and
discontinuing the comparing and judging when either the person to be identified is judged to correspond to the selected registered iris data or a determination is made to discontinue according to a defined criteria.

12. The device of claim 11, further comprising
a storage unit; and
means for retrieving from the storage unit, registered iris data corresponding to received personal identification indicia; wherein the selected registered iris data is the retrieved registered iris data.

13. An automatic teller machine comprising the device of claim 12.

14. The automatic teller machine of claim 13, wherein if the iris pattern of the person to be identified corresponds to the retrieved iris pattern corresponding to the personal identification indicia, the automatic teller machine allows the person to execute an automatic teller machine transaction.

15. The device of claim 11, wherein the means for in succession obtaining images of the iris pattern of the person to be identified is a camera.

16. A device for identifying a person based on an iris pattern of the person, the device comprising
an accumulation buffer;
means for in succession obtaining images of the iris pattern of the person to be identified;
means for generating, from each of the successive images obtained by the image obtaining means, iris data corresponding to the iris pattern; and
means for
identifying in succession, from the successive images, portions of the iris data generated by said generating means which match selected registered iris data,
accumulating in succession, in the accumulation buffers, the successively identified matching portions of iris data from the successive images as well as all other images from which matching portions have been identified,
after each successive accumulation of matching portions of iris data in the accumulation buffer, determining whether the accumulated matching portions of iris data is similar to the selected registered iris data, where similarity is based on a first criterion,
after a determination is made that the accumulated matching portions of iris data and registered iris data are similar, comparing the accumulated matching portions of iris data with the selected registered iris data, and based upon the comparison judging, according to a second defined criterion different from the first criterion, whether the person to be identified corresponds to the selected registered iris data, and
discontinuing the determination, when a determination is made to discontinue according to a third defined criterion.

17. The device of claim 16, further comprising
a storage unit; and
means for retrieving from the storage unit, registered iris data corresponding to received personal identification indicia; wherein the selected registered iris data is the retrieved registered iris data.

18. An automatic teller machine comprising the device of claim 17.

19. The automatic teller machine of claim 18, wherein if the iris pattern of the person to be identified corresponds to the retrieved iris pattern corresponding to the personal identification indicia, the automatic teller machine allows the person to execute an automatic teller machine transaction.

20. The device of claim 16, wherein the means for in succession obtaining images of the iris pattern of the person to be identified is a camera.

* * * * *